US010745029B2

United States Patent
Kapuria et al.

(10) Patent No.: US 10,745,029 B2
(45) Date of Patent: Aug. 18, 2020

(54) PROVIDING RELEVANT ALERTS TO A DRIVER OF A VEHICLE

(71) Applicant: THE HI-TECH ROBOTIC SYSTEMZ LTD, Gurugram, Haryana (IN)

(72) Inventors: Anuj Kapuria, Haryana (IN); Ritukar Vijay, Haryana (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 16/233,104

(22) Filed: Dec. 27, 2018

(65) Prior Publication Data

US 2019/0193753 A1 Jun. 27, 2019

(30) Foreign Application Priority Data

Dec. 27, 2017 (IN) .............................. 201711406927

(51) Int. Cl.
| | |
|---|---|
| *B60W 50/14* | (2020.01) |
| *B60W 40/09* | (2012.01) |
| *B60W 50/10* | (2012.01) |
| *G06K 9/00* | (2006.01) |
| *B60W 40/00* | (2006.01) |
| *G08G 1/0967* | (2006.01) |
| *G08G 1/16* | (2006.01) |
| *G08G 1/0962* | (2006.01) |
| *B60W 40/08* | (2012.01) |

(52) U.S. Cl.
CPC ............ *B60W 50/14* (2013.01); *B60W 40/00* (2013.01); *B60W 40/09* (2013.01); *B60W 50/10* (2013.01); *G06K 9/00288* (2013.01); *G06K 9/00617* (2013.01); *G06K 9/00791* (2013.01); *G06K 9/00845* (2013.01); *G08G 1/09626* (2013.01); *G08G 1/09675* (2013.01); *G08G 1/096716* (2013.01); *G08G 1/096775* (2013.01); *G08G 1/165* (2013.01); *G08G 1/166* (2013.01); *B60W 2040/0809* (2013.01); *B60W 2050/143* (2013.01)

(58) Field of Classification Search
CPC .. B60W 50/00; B60W 50/0097; B60W 50/14; B60W 40/09; G08G 1/096716; G08G 1/09675; G08G 1/096775
See application file for complete search history.

(56) References Cited

U.S. PATENT DOCUMENTS

| | | | | |
|---|---|---|---|---|
| 2005/0143918 A1* | 6/2005 | Hilliard | ................... | G01S 19/19 701/301 |
| 2012/0083960 A1* | 4/2012 | Zhu | ...................... | G05D 1/0214 701/23 |
| 2016/0059775 A1* | 3/2016 | Gorse | ..................... | G01S 19/13 701/468 |

(Continued)

*Primary Examiner* — Andrew W Bee

(57) ABSTRACT

The present subject matter relates to providing alerts to the driver based on external environment and location of the vehicle. Data related to external environment to a vehicle is fetched and the location is determined. Based on the fetched external environment data an event is determined. Also, location parameters are also identified. For the location and the parameters of the location, road and the vehicle are determined, the general driving behavior for the particular location is fetched. Based on the determined event warning is generated for a driver of the vehicle. The intensity of the warning is varied based on severity of the event.

19 Claims, 9 Drawing Sheets

(56) References Cited

U.S. PATENT DOCUMENTS

2016/0363935 A1* 12/2016 Shuster .................... B60L 7/10
2017/0236411 A1*  8/2017 Sumers ................ G01C 21/165
                                                          701/117
2017/0371608 A1* 12/2017 Wasserman ............... G06F 3/14
2018/0319405 A1* 11/2018 Heinze ................ B60W 30/143

* cited by examiner

PROVIDING RELEVANT ALERTS TO A DRIVER OF A VEHICLE

CROSS REFERENCE TO RELATED APPLICATIONS

The present application claims the benefit of Indian Patent application No. 201711046927 filed on Dec. 27, 2017, the contents of which are hereby incorporated by reference.

TECHNICAL FIELD

The present subject matter relates generally to monitoring drivers and external environment for vehicles to provide contextually relevant alerts to the drivers, and particularly to monitoring driving pattern of a driver in a vehicle, and the external environment.

BACKGROUND

Modern vehicles are generally equipped with various types of monitoring systems, such as cameras, or video recorders to monitor surrounding environment of vehicles and provide a driver of a vehicle with useful data regarding the surrounding environment for improved driving. Such monitoring systems may be installed, for instance, on a roof of the vehicle or on the front portion, back portion of the vehicle to have a broad view of the surrounding environment and capture data associated with objects, pedestrians or vehicles within the surrounding environment.

In addition, the monitoring systems may also monitor the driver of the vehicle for facial pose and gaze. For instance, the driver may be monitored for orientation of the face and the gaze to be in a forward direction and determine if the driver is paying attention on the road. The collected data is then subjected to processing to derive meaningful information that may be used in assisting the driver for navigation, changing lanes, and averting a potential collision. An event, such as an approaching vehicle, a pedestrian on the road may be detected and a warning may be issued to the driver to help the driver initiate a precautionary action.

However, such monitoring systems, on many occasions, fail to detect events with accuracy due to various factors such as incomplete data or incorrect data, and issue false or irrelevant warnings to the driver. These warnings are generally issued at high volumes to alert the driver that on many instances may startle or distract the driver, thereby inciting a sudden action that could be potentially harmful for the safety of the driver. Further, such irrelevant warnings issued regularly at high volumes may cause a general discomfort, and impact driving of the driver. Therefore, the monitoring systems are not efficient in detecting events and issuing relevant warning to the drivers for enhancing driving experience and safety.

SUMMARY

This summary is provided to introduce concepts related to monitoring drivers and external environment for vehicles. This summary is not intended to identify essential features of the claimed subject matter nor is it intended for use in determining or limiting the scope of the claimed subject matter.

In an example implementation of the present subject matter, a method for providing contextually relevant alerts to a driver. The method includes steps of detecting a driver based on identification features of the driver. The identification features may be based on biometrics of the driver.

Thereafter, a location of the vehicle may be determined. In an embodiment, the location determining module may be a Global Position System (GPS) module. The data captured by the data capturing module including the surrounding environment information and the driver identification along with the location information is sent to a processing module. The processing module identifies the location and a plurality of defining parameters of the location, road and the vehicle 102. Further, the processing module fetches general driving behavior from a central server that stores driving behavior of a population of drivers that may have driven in that location.

Further, occurrence of an event is detected, for instance, an approaching pedestrian or a vehicle, an object on the road. Upon detection of an event, it is determined whether the driver is already taking a corrective action for the detected event. In case there is no corrective action performed up to a threshold limit, a suggestive warning is generated. Based on the suggestive warning a warning module generates warning based on the detected event. For instance, a continuous beep sound or a voice based alert may be generated to alert the driver about the event.

Although, the present subject matter has been described with reference to an integrated system comprising the modules, the present subject matter may also be applicable to provide alerts to a driver of the vehicle by the modules placed at different areas within an autonomous vehicle, wherein the modules are communicatively coupled to each other.

Thus, the present subject matter provides efficient techniques for detecting the driver and the location, and providing relevant alerts to the driver. The described techniques efficiently detect events and provide warning in a timely manner to the driver. The alerts are based on multitude of parameters and therefore have a higher relevance to the user.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or parameters may be combined in any suitable manner in one or more embodiments.

Figure 1:
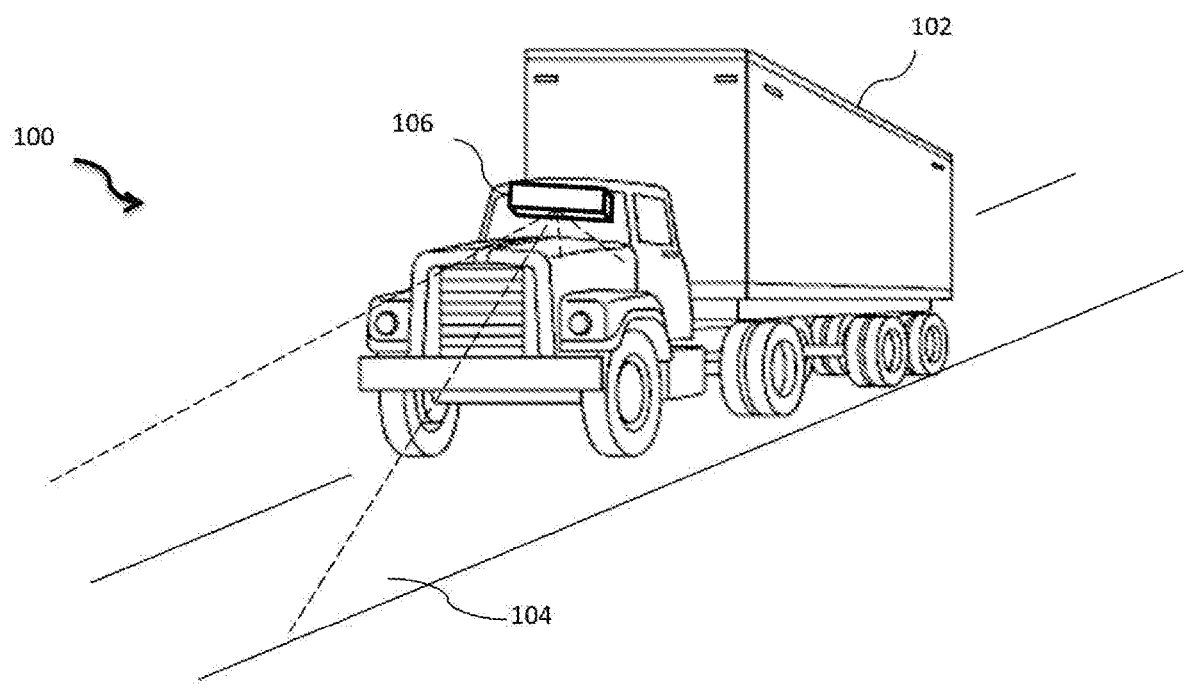
FIG. 1 illustrates an example environment having a vehicle configured with a warning system in accordance with an aspect of the present subject matter.

Referring now to FIG. 1, an example environment 100 in which various embodiments may function is illustrated. As shown the environment 100 includes a vehicle 102, such as a commercial vehicle moving or being driven on a road 104. The vehicle 102 may be a car, a jeep, a truck, a bus, or a three-wheeler vehicle. The vehicle 102 may be provided with physical actuators connected to function parts like brakes, engine control unit, steering wheel, horn and lights.

In an implementation of the present subject matter, the vehicle 102 includes warning system 106 positioned such that the warning system 106 may monitor the driver and the external environment surrounding the vehicle 102 such as, road, outside vehicles, obstacles, and lanes on the roads. For ease of reference, the warning system 106 has been referred to as a system 106, hereinafter.

The positioning of the system 106 is a salient aspect in having maximum visibility of the driver and the external conditions and therefore the warning system is placed at a position within the vehicle 102 to receive the maximum visibility. For instance, the warning system 106 may be positioned close to the rear view mirror of the vehicle 102. It would be noted that, although the system 106 is shown positioned near the rear view mirror, the system 106 may be positioned at other places with in the vehicle 102. For instance, the system 106 may be positioned at a lower position on the windshield, or an "A" pillar of the vehicle 102, and on a dashboard.

The system 106 may have various modules to collect external data, such as data associated with roads, pedestrians, objects, road edges, lane marking, potential collisions, speed signs, potholes, vehicles, location of the vehicle, and a driving pattern of the driver on the road. Additionally, the system 106 may monitor driving pattern of the driver such as whether the driving is in line with the lanes and boundaries of a road. Further, the modules may also capture data related to driver state, such as facial features, retinal scan, blink rate of eyes, eyeball movement, opening of the eye, and head movement of the driver. The system 106 may also warn the driver corresponding to events, such as a pedestrian crossing the road, or a cyclist in front of the vehicle.

It would be noted that system 106, in one example, may have the modules placed at different positions within the vehicle. For instance, the module for monitoring the driver may be coupled to the windscreen and the module to generate the warning may be coupled to the A-pillar. Such components may either be connected through a wired connection or through a wireless communication to communicate and share data.

In one example, the system 106 may be connected to an external server (not shown in figure) through a wireless network, such as a datacenter for cloud backup and data archiving purpose. For instance, information associated with occurrence of an event and preventive action taken by the driver may be recorded for a predefined time span of 1 minute, 30 seconds, or 5 seconds and relayed to the datacenter. Such information may be stored within the datacenter and may be used for analyzing driver pattern during the events and providing useful information to other drivers in similar situations. Also, the information may be utilized for validating insurance claims or insurance premium calculations.

In another example, the system 106 may be connected to the actuators as mentioned above. This helps to take over control of these critical function parts in an event of user failing to react.

The details of the components or modules of the system 106 and functionality of the modules have been further explained with reference to description of the forthcoming figures.

Figure 2A:
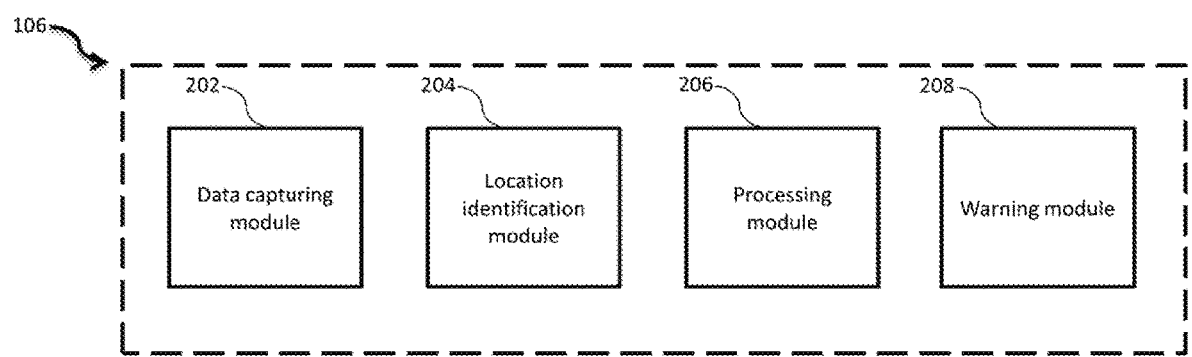
FIG. 2A-2B illustrates various modules of a warning system, in accordance with an aspect of the present subject matter.

FIG. 2A illustrates various modules of the system 106, in accordance with an implementation of the present subject matter. The system 106 includes a data capturing module 202, a location identification module 204, a processing module 206, and a warning module 208. The processing module 206 may be communicably connected to the data capturing module 202, and the location identification module 206. The processing module 206 may also be communicably connected to a memory (not shown in the figure) and the warning generation module 208.

In an implementation, the modules, such as the data capturing module 202, and the location identification module 204, may include routines, programs, objects, components, data structures, and the like, which perform particular tasks or implement particular abstract data types. The modules may further include modules that supplement applications on the system 106, for example, modules of an operating system. Further, the modules can be implemented in hardware, instructions executed by a processing unit, or by a combination thereof.

In another aspect of the present subject matter, the modules may be machine-readable instructions which, when executed by a processor/processing unit, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The data capturing module 202 is configured to collect external and internal information of the vehicle 102. The data capturing module 202 may include various cameras facing inward outward of the vehicle 102. This configuration of the cameras helps the data capturing module 202 to capture data from environment external to the vehicle 102 as well identify driver sitting in the vehicle 102. The cameras facing inward may also capture driver status. Driver status may be identified by capturing various details from the driver's facial expressions, eye gaze, eye movement, ocular opening, etc. Further modules within the data capturing module 202, will be discussed later in detail in conjunction to FIG. 3.

The location identification module 204 is configured to collect the location coordinates of the vehicle in real time. In an embodiment of the invention, the location is collected continuously and forwarded to the processing module 206. In accordance with an implementation of the invention, the location identification module 204 may be a GPS chip that continuously collects the location coordinates.

In another embodiment of the present subject matter, the warning generation module 208 may include an audio, visual, or haptic warning interfaces. The warning generation module 212 may include a Light Emitting Diode (LED) display, a Liquid Crystal Display (LCD), a plasma display, a warning light emitter, a speaker, a haptic feedback module, or a combination thereof.

In yet another embodiment of the present subject matter, the processing module 206, may be configured to and execute computer-readable instructions stored in a memory.

Figure 2B:
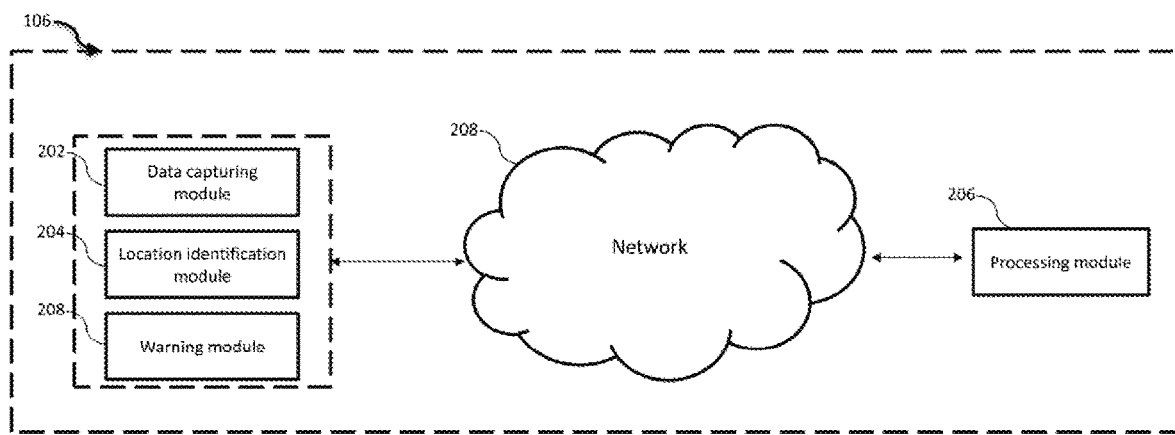

In yet another embodiment of the invention, as depicted in FIG. 2B, the processing module 206 may be remotely placed. In such a configuration, the other modules of the system 106 may be connected to the processing module 206 through wireless communication protocols like mobile communication, satellite communication, etc. through a wireless network 208.

Figure 2C:
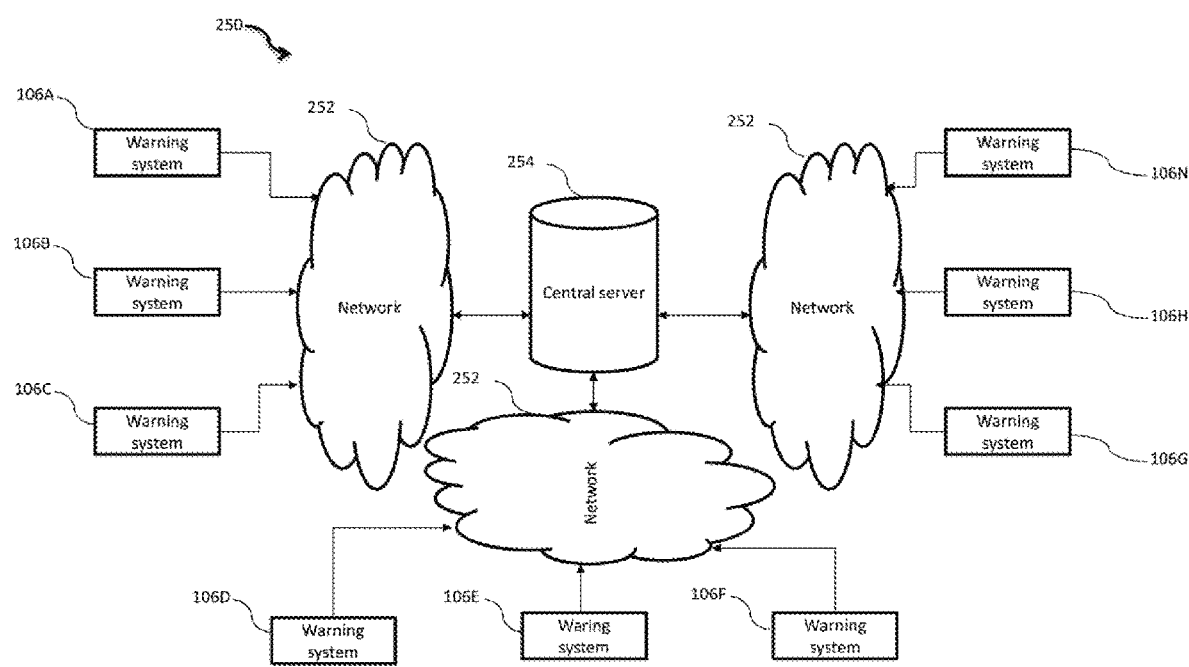
FIG. 2C illustrates a plurality of warning systems connected to each other, in accordance with an aspect of the present subject matter.

FIG. 2C illustrates an environment 250 wherein multiple systems 106A-106N connected to a central server 254, in accordance with an implementation of the present subject matter. The multiple systems 106A-106N may share and store various information with the central server 254. The central server 254. The communication of information may be through a network 252 that may be any one of a satellite communication, or mobile communication protocols. Each of the connected systems 106A-106N may also access information of other systems when required.

Figure 3:
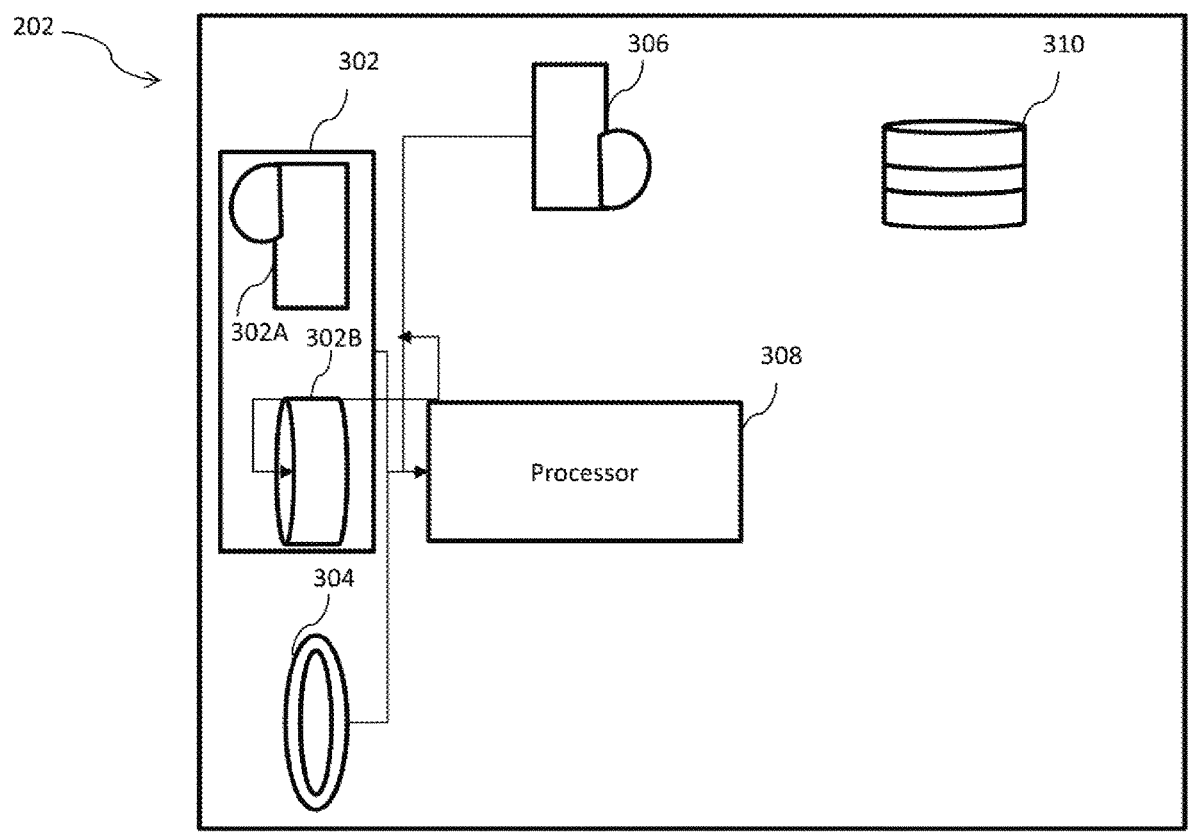
FIG. 3 illustrates various modules of a warning system, in accordance with an aspect of the present subject matter.

FIG. 3 illustrates various modules of the data capturing module 202 (also referred to as Advanced Driver Assistance System or ADAS in the description), in accordance with an implementation of the present subject matter. The ADAS 202 includes an exterior monitoring module 302, a driver monitoring module 306, a ranging module 304, a processor 308, and a memory 310. The processor 308 may be communicably connected to the exterior monitoring module 302, the driver monitoring module 306, and the ranging module 304. The processor 308 may also be communicably connected to the memory 310.

In an embodiment of the present subject matter, the exterior monitoring module 302 may include a stereo camera 302A and a long range narrow field camera 302B. The stereo camera 302A may be a dual lens camera having a short range. This helps the stereo camera 302A to capture data within a short distance of the vehicle 102. The stereo camera 302A captures the nearby objects, events and data. Further, the long range narrow field camera 302B is configured to capture events at a farther distance and hence captures objects, events and data at a longer distance from the vehicle 102. The stereo camera 302A and the long range narrow camera 302B may be configured to adjust autofocus with the changing environment. The capturing ranges of the stereo camera 302A and the long range narrow field camera 302B may overlap to capture maximum data from external environment. The exterior monitoring module 302 is configured to shift its region of interest. The shifting of the region of interest may be based upon a condition of path of travel of the vehicle 102. Details of shifting of region of interest will be described in detail in conjunction with FIGS. 4A-4C.

The driver monitoring module 306 is positioned to face the driver of the vehicle 102 and monitors presence of the driver. The driver monitoring module may also monitor driver state of the driver. The driver's presence may be determined using techniques like motion detection, occupancy sensing, thermal vision etc. The driver monitoring module 306, extracts identification features of the driver, once it is ascertained that the driver is present within the vehicle 102. Identification features extracted may include, but, not limited to facial scan, retinal scan, thermal signatures, fingerprint scan etc. In another example, the user's picture may be taken by the driver monitoring module 306. The identification features extracted may be then compared with a database of drivers stored within a memory 310. On a successful match, the driver identity is then shared with the processing module 206 for further processing.

Also, driver state is determined utilizing driver's eye gaze, facial expressions and head movement. Various driver states that may be determined by the driver monitoring camera are fatigue, sleepiness, anger, happy, jolly, sad, neutral, etc. Hence the driver monitoring module 306 is capable of determining multiple driver states. In another implementation of the present subject matter, the driver monitoring module 306 may be a charged coupled device camera, or a Complementary Metal Oxide Semiconductor (CMOS) camera.

In yet another embodiment of the present subject matter, the ranging module 304, used for determining distance to objects may be one of a light detection and ranging (LiDAR) unit, a radio detection and ranging (RADAR), a sonic detection and ranging (SODAR), and a sound navigation and ranging (SONAR).

The processor 308, amongst other capabilities, may be configured to fetch and execute computer-readable instructions stored in a memory. The processor 308 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software.

The processor 308 and other modules like the exterior monitoring module 302, the driver monitoring module 306, and the ranging module 304 as described above may be implemented as hardware or software. If such modules are implemented in software, one or more processors of the associated computing system that performs the operation of the module direct the operation of the computing system in response to having executed computer-executable instructions. For example, such computer-executable instructions may be embodied on one or more computer-readable media that form a computer program product. In another implementation, the processor 308 may also be connected to GPS, indicator of the vehicle 102 or pre-fed path of the route to be covered by the vehicle 102.

In yet another embodiment of the present subject matter, the memory 310 may be utilized to store the collected external environment and internal environment data collected. The memory 310 may be without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

In operation, the exterior monitoring module 302 may continuously record the surrounding environment of the vehicle 102 and provide the input to the processor 208. In one example instant, the surrounding environment may include a pedestrian crossing the road and about 200 meters away from the vehicle 102, two vehicles ahead of the vehicle 102 at distances 210 meters and 220 meters and a cyclist on a left lane at a distance of 225 meters from the vehicle 102. The objects in the surrounding environment, such as the pedestrian, the two vehicles, and the cyclist are continuously monitored by the exterior monitoring module 302 in real-time and sent to the processor 308.

In another example, the exterior monitoring module 302 may also detect the lanes or boundaries of a road or path travelled by the vehicle 102.

The exterior monitoring module 302 may capture the driving pattern of the driver based on the area of the road 104 covered by the vehicle 102 during travel. For instance, the exterior monitoring module 302 may capture multiple images at various times of the travel. The timings of the images may be defined in micro seconds. These images may be utilized to extract road details and compared with subsequent road details from other images. The driving pattern of the driver may be classified on the basis of frequency of changes in road details as extracted from images. In a scenario, the vehicle may be driven in a zig-zag manner that does not align with the one of the road boundary and the lane and frequently crosses the lanes. In an example implementation, the vehicle 102 may be driven in a wave-manner.

It would be noted that the driving pattern is indicative of the manner in which the vehicle 102 is being driven on the road 104. For instance, when a driver is attentive then the driver is likely to drive in alignment with the lane or the boundary and when the driver is inattentive, drowsy, or under the influence of a drug, the driver may drive inconsistently and not in alignment with the lane or the boundary.

Similarly, driver state data is captured by the driver monitoring module 304. For example, the driver monitoring module 306 may continuously record facial expressions of the driver for eye gaze, blink rate of eyelids, change in skin tone, nostrils, jaw movements, frowning, baring teeth, movement of cheeks, movement of lips and head movements when the driver is driving the vehicle on the road 104. The continuous recording of the driver state is fed to the processor 308.

In an example, the processor 308 receives the data from the exterior monitoring module 302 and the driver monitoring module 304 and processes the received data. Therefore, the processor 308 processes the data and sends the processed data to the processing module.

Figure 4:
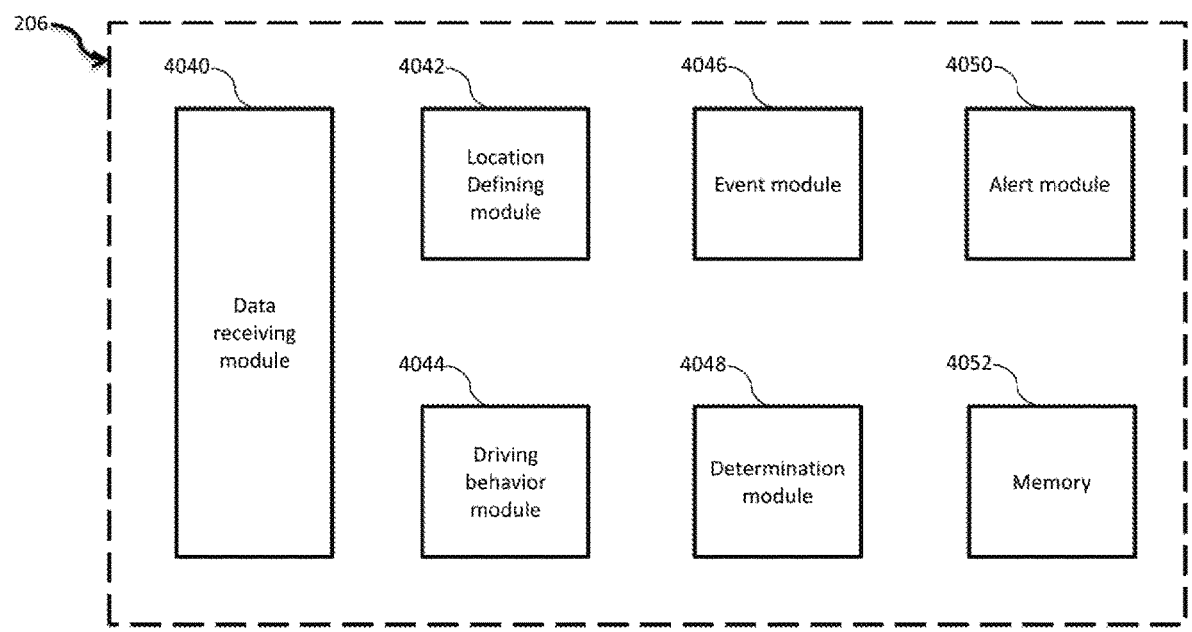
FIG. 4 illustrates a block diagram of a processing module of the system, in accordance with an aspect of the present subject matter.

FIG. 4 illustrates various modules of the processing module 206. The various modules may be microcontrollers functioning in tandem with each other to achieve coordinated output from the processing module 206. The processing module 206 includes a data receiving module, 4040, a location defining module 4042, a driving behavior module 4044, an event module 4046, a determination module 4048, an alert module 4050, and a memory 4052. The determination module 4048 may be communicably connected to the location defining module 4042, the driving behavior module 4044, the event module 4046, the alert module 4050, and the memory 4052.

In an implementation, the engines such as the location defining module 4042, the driving behavior module 4044, the event module 4046, the determination module 4048, and the alert module 4050 may include routines, programs, objects, components, data structure and the like, which perform particular tasks or implement particular abstract data types. The modules may further include modules that supplement applications on the processing module 206, for example, modules of an operating system. Further, the modules can be implemented in hardware, instructions executed by a processing unit, or by a combination thereof.

In another aspect of the present subject matter, the modules may be machine-readable instructions which, when executed by a processor/processing module, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The data receiving engine 4040 is communicably connected to the location defining module 4042, the driving behavior module 4044 and the event module 4046. The data receiving module 4040 forwards the data received simultaneously to the location defining module 4042, the driving behavior module 4044 and the even engine 4046 for simultaneous processing. The determination module 4048 may also be communicably connected to the location defining module 4042, the driving behavior module 4044, and the event module 4046.

In an example operation, the data receiving module 4040 may receive data associated with environment external to the vehicle 102. The external environment data may include data like objects in front of the vehicle both stationary and mobile. Also, there may be other information like road signs, road conditions, parameters of driving like rash driving or careful driving etc. This data may be then forwarded to the data receiving module 4040 and to the event module 4046.

The data receiving module 4040 may also be configured to receive location data from the location identification module 204. The location data may include coordinates of the location that is the latitude and longitude of the location or any other basic identifier. The location identification data may be then forwarded to the location defining module 4042.

The location defining module 4042, extracts multiple parameters of the location, road 104 and vehicle 102 are identified. Parameters may include details like city or rural area, high or low traffic area, good or bad road conditions, general driving pattern of people, hilly or plain terrain, fuel information, brake status, tire information etc.

The driving behavior module 4044, fetches a general driving behavior from a population of drivers. The general driving behavior may include data about how the drivers, in the location identified, generally drive and their driving patterns in the location. General driving behavior may be, as described earlier, stored within the central server 254.

The event module 4046, analyzes data from the data capturing module 202. As described earlier, the data capturing module captures 2 types of data that include external environment data, the driver state data and the driver identification data. The event module 4046, analyzes the external environment data and the driver state data to determine if there is any kind of event being faced by the vehicle. The event may be a sudden braking of vehicle in-front, sudden movement of a pedestrian, etc.

The determination module 4048, may be connected to Electronic control unit (ECU) of the vehicle 102. The determination module may be activated once, an event is detected by the event module 4046. The determination module 4048 determines, whether the driver, in response to the event being faced has taken or started to take any corrective action or not. For example, in case of a sudden braking of vehicle in front, whether the driver has initiated to put pressure on brake pedal or not. Further, the determination module 4048 may check that whether the driver has taken any corrective action for a threshold limit. The threshold limit may be a time limit or distance limit etc. the threshold limits may be pre-fed or may be analytically calculated by the event module 4046 in event of a situation.

The alert module 4050, may generate a suggestive warning based on the output of the determination module 4048. In case, the driver has not taken a corrective action till the threshold limit, the alert module 4050 may be initiated by the determination module 4048 to generate an alert. The alert module 4050, may also determine to vary the intensity of the alert based on the event information that it may gather from the event module 4046.

In an example, condition information of a road may be fetched from the central server 254. The road condition information may include details like if there are any potholes, road terrain, narrow or broad etc. Further, the driving experiences of other drivers, that have experienced the road conditions, are also fetched. Experiences may include information like jerking, wear and tear of the tires, poor grip on the road, etc. This information may be utilized by the ADAS 106 to provide suggestive drawings like suggestion to drive slow, apply brakes at certain areas early to avoid bad road condition etc.

By way of another example, the ADAS 106 may gather information about contouring of the road 104 that is whether the road is a hilly one or in plains. Further experience information of other drivers stored in the central server 254 is also fetched. Combination of both information may then be used to provide suggestive warnings like suggestion for driving gear, braking, speeding to maintain a good fuel efficiency in such conditions, etc.

The alerts module 4050, may send the suggestive warning to the warning module to present the alert to the driver of the vehicle 102.

In an example implementation, intensity of the warning may be varied based on the classification of the detected event by the processing module. For instance, when the vehicle is approaching a pedestrian, who is at a distance of around 250 meters, and the driver is attentive, then volume of the beep sound may be low. However, when the vehicle is approaching the pedestrian with speed, the volume of the beep sound is increased until a preventive action is taken to avert a collision or until the pedestrian reaches a safe place that is outside the view of the exterior monitoring module.

It would be noted that the driver monitoring module, the exterior monitoring module, the processor, and the warning generating module may operate in real-time to capture and process the data to generate the warning. Further, the intensity of the warning is also varied in real-time based on criticality of the event.

The memory 4052, may be utilized to store the event information and the driver's corrective information or the type of alert and its intensity produced for future usage. This information may then also be sent to the central server 254.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 5:
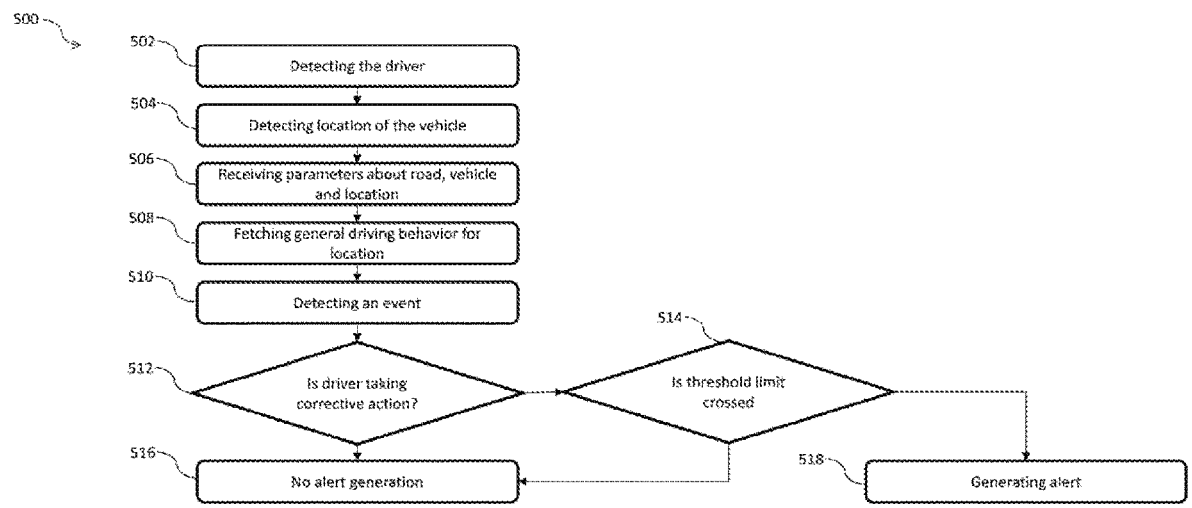
FIG. 5 illustrates a method for providing alert to a driver of a vehicle, in accordance with an aspect of the present subject matter.

FIG. 5, illustrates a method 500 for providing alert to the driver of the vehicle 102, in accordance to an embodiment of the present subject matter. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 502, the driver presence is detected within the vehicle 102. The detection may be done using presence sensing technique, motion sensing technique, etc. After sensing the presence the driver is identified. The data capturing module 202, as described earlier may include driver monitoring camera 306 that may identify the driver. At step 504, the location of the vehicle 102 is determined.

At step 506, various parameters of the location, road 104 and vehicle 102 are identified. The various parameters have been described earlier in the description. Based on the parameters extracted, at step 508, the general driving behavior for the location with the parameters is fetched from a central server like 254. The general driving behavior is the normalized driving behavior from the population of drivers that may have driven in the location with certain kinds of parameters identified.

At step 510, the processing module 206, identifies or determines if the vehicle 102 faces any event, as has been described earlier. In case the vehicle 102 faces an event, at step 512, it is determined that whether the driver is taking any corrective action. If the driver has taken the corrective action, at 516, it is indicated to the alert module 4050, not to generate any alert. Further, at 514, in case there is no corrective action taken, the alert module 4050 then checks whether the threshold limit has been crossed or not. threshold limit may be time or distance. In case, the threshold limit is crossed then the alert module 4050, at step 518, generates an suggestive warning to the warning module to present the alert to the driver. If the threshold limit is not crossed, no alert is generated.

Figure 6:
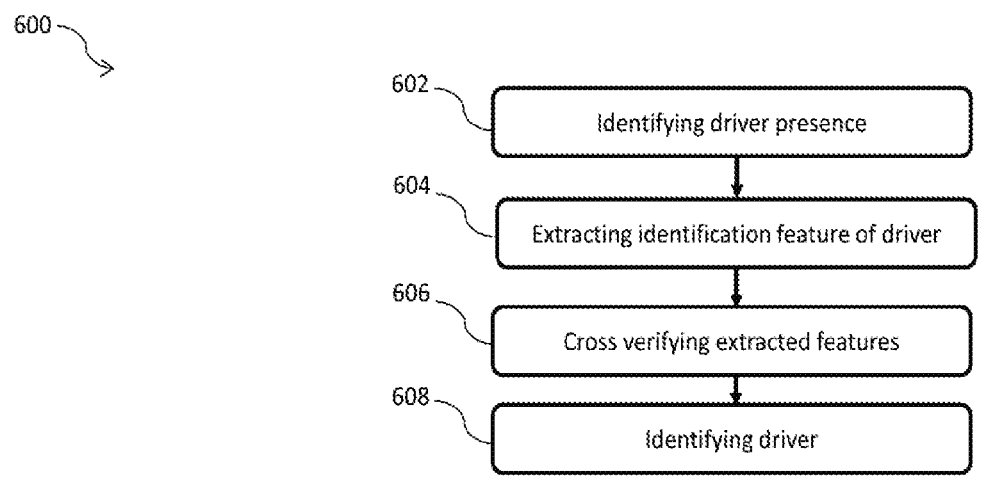
FIG. 6 illustrates a method for identifying a driver, in accordance with an aspect of the present subject matter.

FIG. 6 illustrates a method 600, for identification of the driver of the vehicle 102. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 602, driver presence is identified within the vehicle. The driver presence may be detected using various known techniques like motion sensing, presence sensing, thermal imaging etc. At step 604, once the presence of the driver is identified, the driver monitoring module 306, extracts various identification features of the driver. The various identification features that may be extracted for identification have been enlisted in the description earlier.

Further, at step 606, the identification features are cross verified with the set of features stored in the memory. At step 608, on a successful verification, the identity of the driver is ascertained.

Figure 7:
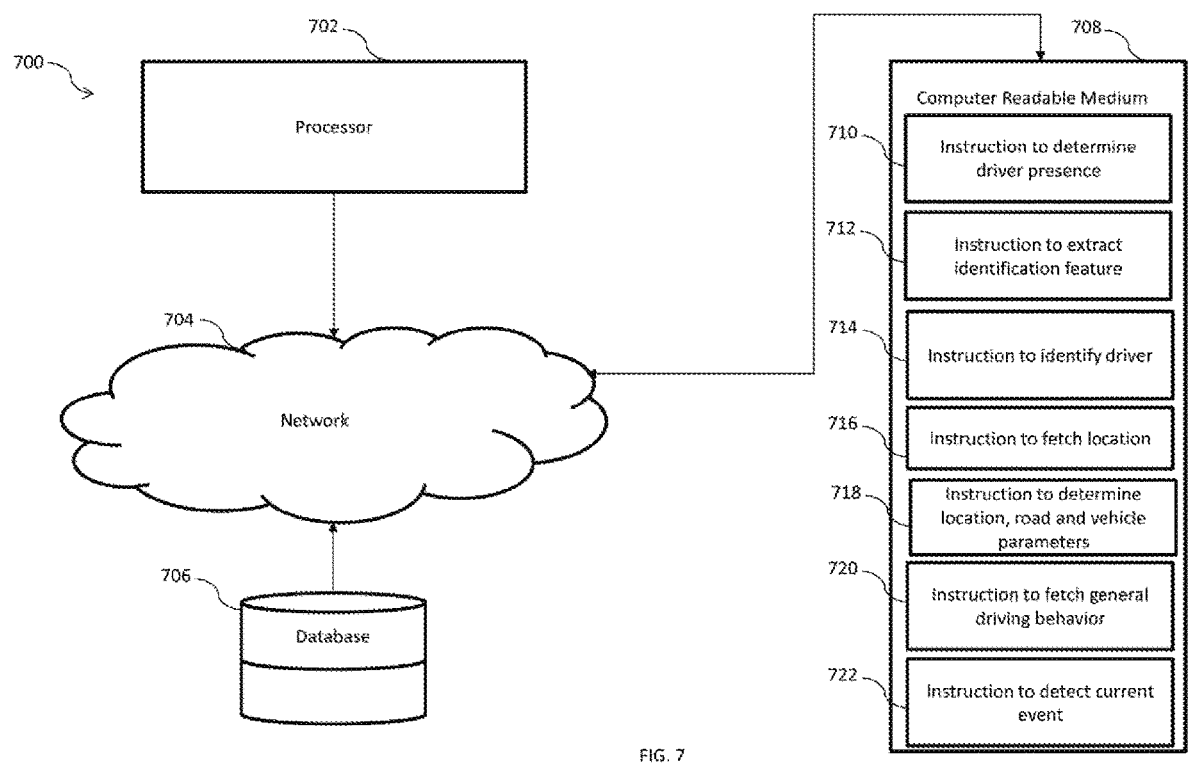
FIG. 7 illustrates an exemplary computer system, in accordance with an aspect of the embodiments.

Referring now to FIG. 7 illustrates an exemplary computer system 700 for implementing various embodiments is disclosed. The computer system 700 may comprise a central processing unit ("CPU" or "processor") 702. The processing unit 702 may comprise at least one data processor for executing program components for executing user- or system-generated requests. The processing unit 702 may include specialized processing units such as integrated system (bus) controllers, memory management control units, floating point units, graphics processing units, digital signal processing units, etc. The processing unit 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, the processing unit 702 may be disposed in communication with a communication network 704 via a network interface (not shown in figure). The network interface may communicate with the communication network 704. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 804 may include, without limitation, a direct interconnection, local area network (LAN), wide area network (WAN), wireless network (e.g., using Wireless Application Protocol) etc.

In some embodiments, the processing unit 702 may be disposed in communication with one or more databases 706 (e.g., a RAM, a ROM, etc.) via the network 704. The network 704 may connect to the database 706 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. The database may include database from the exterior monitoring module 302, the ranging module 304 and the driver monitoring module 306.

The processing unit 702 may also be disposed in communication with a computer readable medium 708 (e.g. a compact disk, a USB drive, etc.) via the network 704. The network 804 may connect the computer readable medium 808 including without limitation, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium. The computer readable medium 708 may be processed by the computer system 8700 or in any other computer system. The computer readable medium 708 may include instructions like instruction to monitor driver state, instruction to monitor external environment, instruction to detect events, instruction to generate warnings, or instructions to vary warning intensity.

It will be appreciated that, for clarity purposes, the above description has described embodiments of the present subject matter with reference to different functional units and processors. However, it will be apparent that any suitable distribution of functionality between different functional units, processors or domains may be used without detracting from the present subject matter.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Alternatively, the method may be implemented using a combination of a processing unit 702, a non-transitory Computer Readable Medium (CRM) 708, Database 706 all connected to a network 704. The computer readable medium may include instructions that may be fetched by the processing unit 702. The instructions may include instruction to determine driver presence 710, instruction to extract identification feature 712, instruction to identify driver 714, instruction to fetch location 716, instruction to determine location, road, and vehicle parameters 718, instruction to fetch general driving behavior 720, and instruction to detect current event 722.

In one example, the processing unit 702 may execute the instruction to determine driver presence 710 to initiate determining of the driver presence by driver monitoring module 306. The driver monitoring module 306 may determine a driver's presence using motion, presence and thermal sensing techniques. Further, the processing unit 702 may also execute the instruction to extract identification feature 712.

In an example implementation, the processing unit 702 may execute the instruction to identify driver 714 to process the identification features received. The identification features may be a facial scan, a retinal scan, a thermal scan, biometric scans like fingerprints etc. After identifying the driver, the processing unit 702 may execute the instruction to fetch location of 716.

Thereafter, the processing unit 702 executes the instruction to determine location parameters 718 to determine various parameters about the location currently at which the vehicle 102 is at, road, and vehicle. Further, the processing unit 702 may execute instruction to fetch general driving behavior 720. The general driver behavior may be a generalized driving behavior of the population of drivers that have crossed same location having similar parameters like similar traffic, same elevation of road, etc. The processing unit 702, may further execute instruction to detect current event 722 on the road from the external environment information captured by the data capturing module 202.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

Therefore, the present subject matter provides an efficient mechanism of detecting an event and issuing relevant warning to the user with accuracy, wherein the intensity is varied as per the situation. Variation of the intensity helps in providing apt level of warning to the driver of the vehicle that enables the driver to take apt decision about handling the situation and improves driver experience. Further, the present subject matter detects event in situations when one data set may not be available thereby increasing robustness and reliability of the system and enhancing overall driver safety.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing assistance to a driver of a vehicle, comprising;
   detecting a driver based on identification features of the driver;
   determining location of the vehicle;
   monitoring in real-time the driving of the vehicle on a road;
   detecting an event on the road travelled by the vehicle, the event requiring a prompt action from the user;
   fetching general driving behavior from a population of drivers, stored in a central server, for the location;
   receiving parameters about the location, the vehicle, and a road;
   determining whether the driver has initiated a corrective action corresponding to the event; and
   providing a suggestive warning to the driver based on the general driving behavior and the parameters, upon absence of the corrective action;
   wherein the parameter is any one or a combination of a vehicle status, a fuel information, and a vehicle functioning information.

2. The method of claim 1, wherein the detection is performed by a camera module by extracting biometric features of the driver.

3. The method of claim 2, wherein the biometric features is one or a combination of facial recognition, or retinal scan.

4. The method of claim 1, wherein the location of the vehicle is one or a combination of a city, or an area within a city.

5. The method of claim 4, wherein the area within the plurality of defining parameters is one or a combination of a hilly area, a plain area or an overly crowded area.

6. The method of claim 1, wherein the event is a traffic situation, a blind curve, a pedestrian, a car slowing down, or a sudden curve in road.

7. The method of claim 1, wherein the suggestive warning is issued after a threshold limit, wherein the threshold limit is one of a time limit, or a distance limit.

8. The method of claim 7, wherein the suggestive warning is anyone of a visual or audio alert.

9. The method of claim 1, wherein the parameters is any one or a combination of a road conditions, and traffic conditions.

10. A system for providing alert to a driver of a vehicle comprising;

a data capturing module, wherein the data capturing module is configured to;
  capture surrounding environment information; and
  detect the driver;
  extract identification features; and
  identify the driver using the identification features;
a location determining module, configured to determine location of the vehicle;
a processing module, communicatively coupled to the data capturing module and the location determining module configured to;
  fetch general driving behavior from a population of drivers, stored in a central server, for the location;
  receive parameters about the location, the vehicle, and a road;
  monitor in real-time the driving of the vehicle on a road;
  detect an event on the road travelled by the vehicle, the event requiring a prompt action from the user;
  determine whether the driver has initiated a corrective action corresponding to the event; and
  provide a suggestive warning based on the general driving behavior and the parameters, to the driver upon absence of the corrective action, wherein the parameter is any one or a combination of a vehicle status, fuel information, and vehicle functioning information;
a warning module, communicatively coupled to the processing module, wherein the warning module receives the suggestive warning and provides it to the driver.

11. The system of claim 10, wherein the suggestive warning is variable real-time based on the severity of the event being faced.

12. The system of claim 10, wherein the data capturing module is a camera module comprising outward facing and inward facing cameras.

13. The system of claim 12, wherein the outward facing cameras are stereo cameras or long-range cameras or a combination of both.

14. The system of claim 12, wherein the inward facing cameras extract biometric features of the driver.

15. The system of claim 10, wherein the identification is done by communicating with a storage and comparing identification features to identify the driver.

16. The system of claim 10, wherein the processing module is available remotely from the vehicle.

17. The system of claim 10, further communicatively coupled to vehicle's processing unit to determine vehicle parameters.

18. The system of claim 10, wherein the warning module is a Liquid Crystal Display, or a Light Emitting Diode Array, or a speaker array.

19. The system of claim 10, wherein the location determining module is a Global Positioning System (GPS) module.

* * * * *

UNITED STATES PATENT AND TRADEMARK OFFICE
CERTIFICATE OF CORRECTION

PATENT NO. : 10,745,029 B2  
APPLICATION NO. : 16/233104  
DATED : August 18, 2020  
INVENTOR(S) : Anuj Kapuria et al.

Page 1 of 1

It is certified that error appears in the above-identified patent and that said Letters Patent is hereby corrected as shown below:

On the Title Page

Item (30), the foreign application priority data should read 201711046927 instead of 201711406927.

Signed and Sealed this  
Twenty-second Day of December, 2020

Andrei Iancu  
*Director of the United States Patent and Trademark Office*